April 7, 1925.

W. P. KINSELLA

HAND TRUCK

Filed May 2, 1924

William P. Kinsella
INVENTOR

BY Victor J. Evans
ATTORNEY

WITNESS:

Patented Apr. 7, 1925.

1,532,700

UNITED STATES PATENT OFFICE.

WILLIAM P. KINSELLA, OF BAYSIDE, NEW YORK, ASSIGNOR OF ONE-HALF TO BERT G. BALL, OF ASTORIA, NEW YORK, AND OF ONE-HALF TO CHARLES F. HEERLEIN, OF LONG ISLAND CITY, NEW YORK.

HAND TRUCK.

Application filed May 2, 1924. Serial No. 710,655.

*To all whom it may concern:*

Be it known that I, WILLIAM P. KINSELLA, a citizen of the United States, residing at Bayside, Long Island, in the county of Queens and State of New York, have invented new and useful Improvements in Hand Trucks, of which the following is a specification.

This invention relates to hand trucks and has for its object the provision of a truck constructed, or adapted by means of an attachment thereto, for use in lifting and transporting articles having legs, or in other words such devices as stoves, radiators and many types or articles of furniture and the like.

An important and more specific object is the provision of a wheeled hand truck so constructed and arranged that it may be trundled or rolled under the articles to be lifted, the truck having mounted thereon a stop which is adjustable longitudinally thereof and which acts as the point of purchase for effecting lifting of the article to be transported, the adjustability of this member permitting satisfactory use of the truck when handling articles having legs of different length.

An additional object is the provision of a truck which will be simple and inexpensive in manufacture, easy to adjust and use, positive in action, efficient and durable in service and a general improvement in the art.

Figure 1:
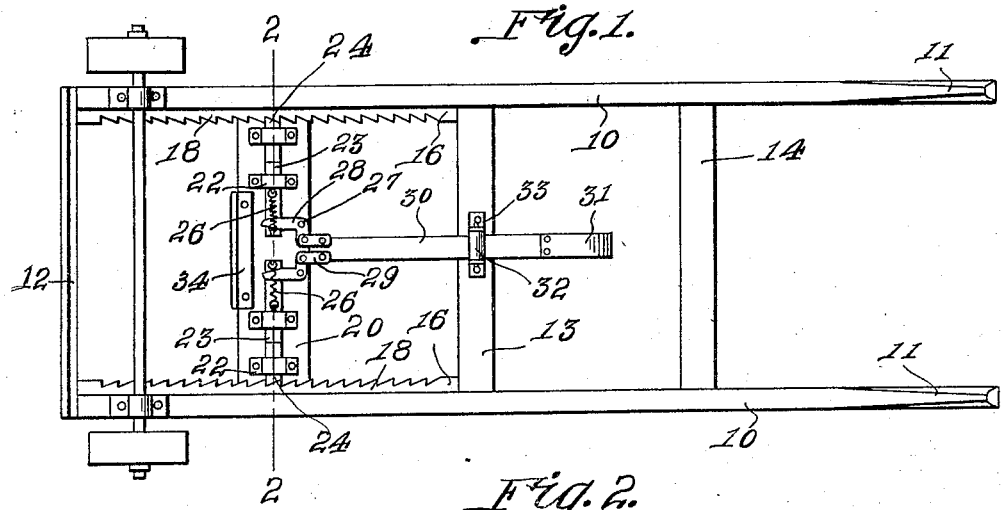
Figure 2:
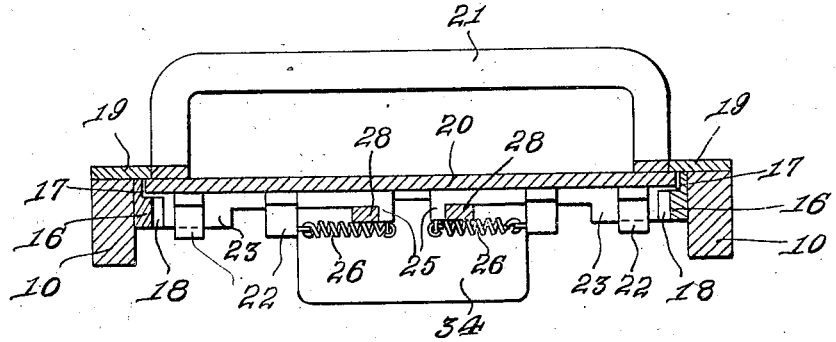
Figure 3:
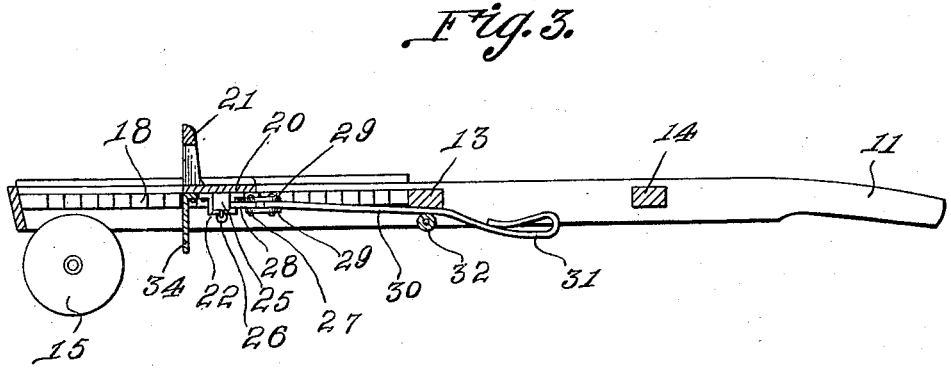

With the above and other objects and advantages in view the invention consists in the details of construction to be hereinafter more fully described and claimed and illustrated in the accompanying drawings, in which:

Figure 1 is a bottom plan view of a truck constructed in accordance with my invention, Figure 2 is a section on the line 2—2 of Figure 1, Figure 3 is a longitudinal section.

Referring more particularly to the drawings I have shown the truck as comprising a pair of side bars 10 formed or equipped at one end with handles 11 and connected at their other ends and at intermediate points by cross members 12, 13 and 14. Suitably journaled beneath the side bars 10 are rollers 15 of any desired size and of conventional pattern. Up to this point there is nothing distinctive about this special truck, the essential features being those to be described.

In carrying out the present invention I provide a pair of ratchet bars 16 mounted and suitably secured to the confronting faces or edges of the side bars 10 between the cross pieces 12 and 13. These ratchet bars are constructed to provide grooves 17 above the ratchet teeth indicated individually by the numeral 18. Secured upon the tops of the side bars 10 are plates 19 which extend over the grooves 17 so as to define guides.

Extending transversely between the side bars 10 is a plate 20 which has its ends slidable within the grooves 17 and which carries at its top an upstanding U-shaped yoke or foot piece 21.

In order that the plate member 20 may be held in any desired position, I provide upon the bottom thereof two pairs of spaced guides 22 through each pair of which is slidable a latch or pawl 23 having an inclined end 24 for co-operation with the ratchet teeth 18. These pawls or latches are oppositely arranged as shown so as to engage both of the bars 16, and the inner ends are formed with depending extensions 25 with which are connected coil springs 26 which are in turn connected with the adjacent guides 22 whereby to urge the latches outwardly into co-operative relation to the ratchet bars.

Pivoted at 27 on the underside of the plate 20 are angle or bell cranks 28 arranged oppositely as shown. These angle levers or bell cranks are so arranged or disposed that the forwardly extending arms thereof engage against the outer side of the depending extensions or projections 25. The rear arms of these angle levers are directed toward each other and pivotally connected therewith are links 29 which are pivoted upon the forward end of a strap 30 which may conveniently be of leather or other flexible material. This strap extends under the cross member 13 and terminates at its rear end in a loop 31 constituting a handle. Mounted on the underside of the cross piece 13 is a roller 32 journaled in suitable brackets 33 and acting as a guide for the strap.

In order to move the plate 20 and parts carried thereby towards the handle end of the truck, it is merely necessary for the operator to grasp the loop 31 and pull rearwardly thereon whereupon the angle levers or bell cranks 28 will pull the latches or pawls 23 toward each other against the resistance of the springs 26 and retract the teeth 24 from engagement with the ratchet bars. A continuous pull upon the strap results in moving the plate 20 bodily along the truck. In order to move the plate in the opposite direction, it is necessary to apply a slight pull to the strap and at the same time press downwardly upon a toe piece 34 which is mounted on the underside of the plate 20. As the tension on the strap holds the latches or pawls out of engagement with the ratchet bars it is apparent that pressing upon the toe piece will slide the plate 20 forwardly along the truck.

In the use of the device, the plate 20 carrying the foot member 21 is adjusted to the desired position, and the truck is rolled under the article to be lifted and transported, the position being such that the foot member 21 will be beyond or at the far side of the article. When the operator then grasps the handles 11 and lifts the truck, it is quite obvious that the portion of the truck rearwardly of the foot member 21 will engage beneath the article to be lifted and between the legs thereof, while the far side of the article will bear against the foot member 21. The article is thus easily lifted and carried to the desired place when it may be deposited merely by permitting the truck to lower, after which the truck is rolled out from under the article.

From the foregoing description and a study of the drawings it is believed that the construction, operation and advantages will be readily apparent to those skilled in the art without any necessity for further elaboration.

While I have shown and described the preferred embodiment of my invention it is of course to be understood that I reserve the right to make such changes in the form, construction and arrangement of parts as will not depart from the spirit of the invention or the scope of the subjoined claims.

I claim:

1. In a truck having sides connected by cross bars, ratchet bars secured upon the confronting sides of the side bars, a plate slidably mounted between the side bars, outwardly spring pressed latch bars slidably mounted upon the plate and engaging said ratchet bars for maintaining said plate in an adjusted position, and means connected with said latch bars for retracting them from engagement with the ratchet bars, said means comprising angle levers pivoted upon the plate and pivotally connected with the latches, and a longitudinally extending and movable member guidably mounted on the truck and connected with the angle levers.

2. In a hand truck, including side bars connected at intervals by cross bars and equipped with rollers, ratchet bars secured upon the confronting side of the side bars, a plate slidable along the truck, outwardly spring pressed latches mounted on said plate and cooperating with the ratchet bars for holding the plate at a selected position, a toe piece depending from the plate, an upstanding foot piece on the plate and means slidable along the truck and connected with the latches whereby to retract them from engagement with the ratchet bars.

3. In a truck including side bars, cross bars and supporting rollers, ratchet bars mounted upon the confronting faces of the side bars, an elongated plate extending between the side bars, guide means for the plate, outwardly spring pressed latches mounted on the underside of the plate and terminating in teeth cooperating with the ratchet bars for holding the plate in a selected position, angle levers pivoted on the underside of said plate and connected with said latches, and a longitudinally slidable member terminating at one end in a handle, and having its other end connected with the angle levers and operable whereby to withdraw the latches from engagement with the ratchet bars.

In testimony whereof I affix my signature.

WILLIAM P. KINSELLA.